No. 897,057. PATENTED AUG. 25, 1908.
E. J. BROOKS.
ATTACHMENT FOR CULTIVATORS.
APPLICATION FILED OCT. 26, 1907.

2 SHEETS—SHEET 1.

WITNESSES:

INVENTOR
E. J. Brooks
BY
W. J. Fitzgerald & Co.
Attorneys

No. 897,057. PATENTED AUG. 25, 1908.
E. J. BROOKS.
ATTACHMENT FOR CULTIVATORS.
APPLICATION FILED OCT. 26, 1907.

2 SHEETS—SHEET 2.

WITNESSES: INVENTOR
E. J. Brooks
BY
W. J. Fitzgerald
Attorneys

UNITED STATES PATENT OFFICE.

ELBERT J. BROOKS, OF SPARTA, WISCONSIN.

ATTACHMENT FOR CULTIVATORS.

No. 897,057.    Specification of Letters Patent.    Patented Aug. 25, 1908.

Application filed October 26, 1907. Serial No. 399,369.

*To all whom it may concern:*

Be it known that I, ELBERT J. BROOKS, a citizen of the United States, residing at Sparta, in the county of Monroe and State of Wisconsin, have invented certain new and useful Improvements in Attachments for Cultivators; and I do hereby declare the following to be a full, clear, and exact description of the invention, such as will enable others skilled in the art to which it appertains to make and use the same.

My invention relates to new and useful improvements in attachments for cultivators and more particularly to that class adapted to be used in cultivating growing plants, and my object is to provide means for traveling over the row of growing plants to loosen the soil therearound, without injuring the plants.

A further object is to provide means for yieldingly securing the same to the cultivator frame.

A still further object is to provide a drum and secure the cultivator teeth thereto and a still further object is to provide means for raising and lowering the attachment.

Other objects and advantages will be hereinafter referred to and more particularly pointed out in the claims.

Figure 1:
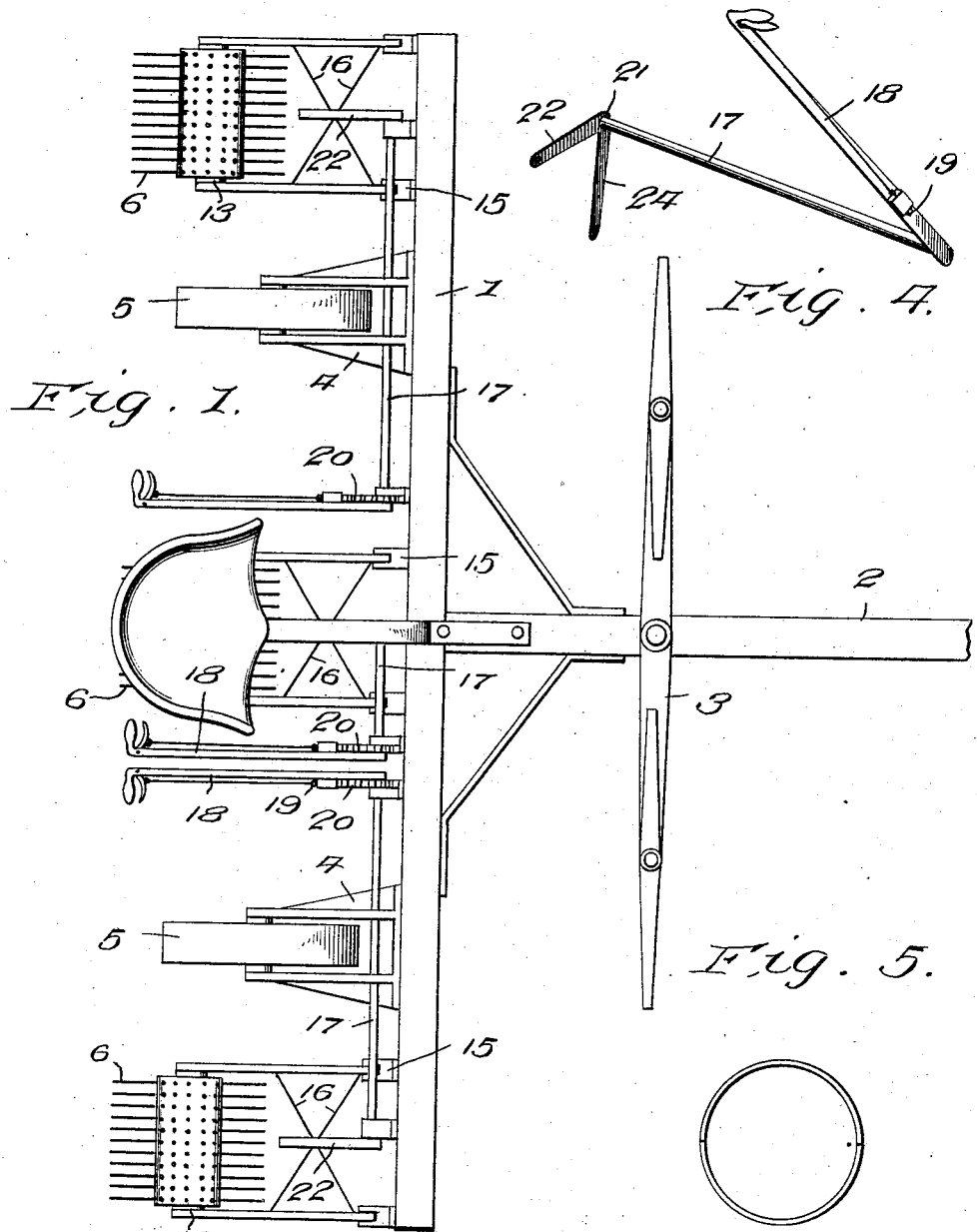
Figure 2:
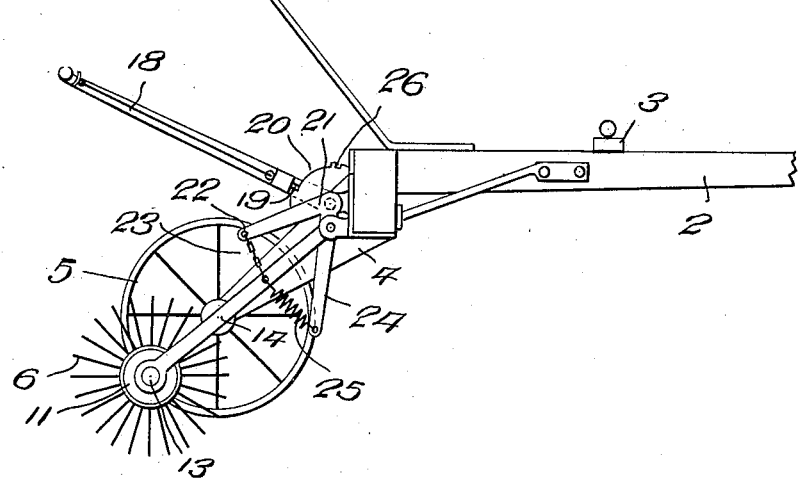
Figure 3:
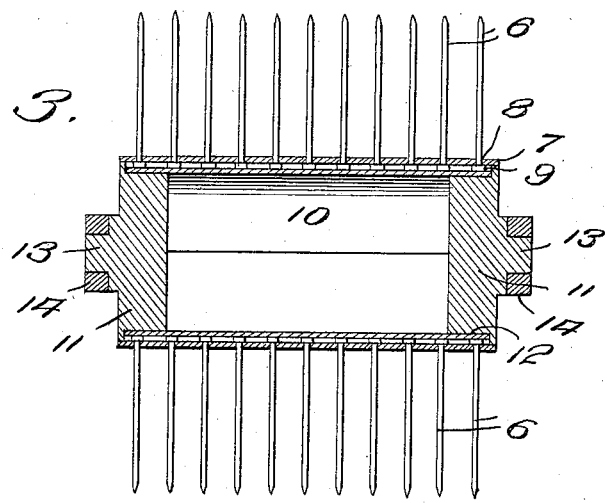

In the accompanying drawings which are made a part of this application, Figure 1 is a top plan view of my improved form of attachment, applied to use. Fig. 2 is a side elevation thereof. Fig. 3 is a sectional view through the attachment, and, Fig. 4 is a perspective view of one of the levers employed for raising the attachments, and, Fig. 5 is an end elevation of a device for securing the cultivator teeth in position.

Referring to the drawings in which similar reference numerals designate corresponding parts throughout the several views, 1 indicates a beam, to the longitudinal center of which is secured a tongue 2, said tongue being adapted to carry double trees 3, to which are to be attached draft animals.

Fixed at suitable points to the beam 1 and extending rearwardly and downwardly therefrom, are brackets 4, between which are rotatably mounted wheels 5, said wheels being adapted to support the beam 1.

The beam is of sufficient length to extend over a number of rows of growing plants and, in this instance, I have shown the beam of sufficient length to extend over three rows and in order to cultivate the ground between and around the growing plants, I provide my improved attachment, which consists of a plurality of teeth 6, which are arranged in rows across a drum 7, said teeth extending through openings 8 in the drum and having heads 9 at their inner ends.

In order to hold the teeth 6 from moving longitudinally through the openings 8, I provide a shield 10, which is formed in two sections and is adapted to extend into the drum 7 and bind the heads 9 against the inner face of the drum, thereby rigidly fixing the teeth to the drum and in order to prevent longitudinal movement of the shield, independently of the drum 7, disks 11 are introduced into the ends of the drum 7 and are provided on their peripheries with offsets 12, to receive the ends of the shield 10, thereby completely closing the ends of the drum 7 and, at the same time, forming a support for the shield 10.

The outer faces of the disks 11 are provided with trunnions 13, on which are mounted arms 14, the upper ends of said arms being pivotally mounted between ears 15 carried by the beam 1, said arms being of sufficient length to allow the teeth 6 to readily engage the earth's surface and the arms 14 are prevented from spreading, by interposing between said arms, brace rods 16, said rods being preferably crossed, so as to more thoroughly brace the arms.

Rotatably mounted on the rear face of the beam 1, are a plurality of shafts 17, the number of shafts being equal to the number of cultivating attachments employed, each of said shafts having a lever 18 at one end thereof, said lever being provided with the usual form of spring latch 19, which is adapted to coöperate with a disk 20 to hold the attachments in an elevated position. The opposite end of the shaft 17 is provided with a bell-crank lever 21, one shank 22 of which is adapted to extend above the arms 14 and is secured thereto in any suitable manner, as by means of a chain 23, while the opposite shank 24 of the bell-crank lever 21 extends in a plane below the arms 14 and is secured thereto by means of a spring 25, said spring being adapted to exert downward tension on said arms and hold the teeth in engagement with the soil.

The edge of the disk 20 is provided with a plurality of notches 26, in which the latch 19 is adapted to be seated and by extending the shank 24 below the arms 14, the tension of the spring may be readily increased by moving the lever 18 downwardly and will be held in its lowered position by engaging the latch with one of the notches on the disk, the length of the chain 23 being such that the chain will hang loosely when the lever is in its lowered position, thereby permitting the spring 25 to exert tension on the arms 14 and hold the teeth into engagement with the soil and cause the drum to enter depressions or uneven places in the soil.

In operation, the teeth are lowered into engagement with the earth's surface and are successively brought into engagement therewith by the forward movement of the cultivator and in view of the fact that the teeth do not rotate faster than the natural travel of the draft animals, the growing plants will not be injured by coming in contact with the teeth and it will also be seen that by lowering the drum a sufficient distance to force the teeth into engagement with the earth's surface, the earth around and adjacent the growing plants, will be thoroughly loosened and cultivated and, while I have shown the attachment as secured to a particular form of frame, it will be readily understood that the attachment may be secured between the beams of the usual or any preferred form of cultivator.

It will further be seen that the attachment may be very cheaply constructed and readily attached to any form of cultivator, and by providing the bell-crank levers, and attaching the same in the manner shown, the depth to which the teeth enter the soil, may be readily and quickly regulated.

What I claim is:

1. An attachment of the character described, comprising a beam, series of teeth each carried by a shaft, suspending arms for said shafts connected to said beam, axial rods supported from said beam, and means for the actuation of said axial rods, the latter being equipped with bell-cranks, one of the arms of each of said bell-cranks having loose means of connection with the aforesaid suspending arms and the other arms of said bell-cranks having resilient means of connection with said suspending arms adapted to exert pressure upon the latter oppositely to the lifting action exerted through the aforesaid means of connection thereon as said rod-adjustment means is actuated.

2. An attachment of the character described, comprising a beam, series of rotary cultivator teeth carried by shafts, suspending arms for said shafts connected to said beam, axial rods supported from said beam, and means for the actuation of said axial rods, the latter being equipped with bell-cranks, one of the arms of each of said bell-cranks having loose chain connection with the aforesaid suspending arms and the other arms of said bell-cranks having spring-connections with said suspending arms adapted to exert pressure upon the latter oppositely to the lifting action exerted through said chain-connection thereon as said rod adjusting means is actuated.

3. An attachment of the class described, comprising the combination with a frame; of a disk having a plurality of openings therein arranged in series, teeth extending through said openings, heads at the inner ends of said teeth, means to enter said drum and hold the teeth in a fixed position, disks for said drum, trunnions on said disks, arms pivotally mounted on said trunnions, means to pivotally secure the opposite ends of the arms to the frame, shafts on said frame, means to rotate said shafts, bell-crank levers on said shafts, means to anchor one shank of said bell-crank levers to said arms, whereby, when the shafts are rotated in one direction, the drums will be elevated and a spring secured at one end to the opposite shank of said bell-crank levers and at the opposite end to said arms, whereby the teeth will be yieldingly held in engagement with the soil and means to rotate said shafts to raise said drums, or increase the tension of said springs.

In testimony whereof I have signed my name to this specification in the presence of two subscribing witnesses.

ELBERT J. BROOKS.

Witnesses:
  JOHN A. SHOLTS,
  B. E. DAVIS.